UNITED STATES PATENT OFFICE.

GARRET COSINE, OF NEW YORK, N. Y.

IMPROVEMENT IN PROCESSES FOR MAKING ARTIFICIAL BUTTER.

Specification forming part of Letters Patent No. 173,591, dated February 15, 1876; application filed December 21, 1875.

*To all whom it may concern:*

Be it known that I, GARRET COSINE, of the city, county, and State of New York, have invented an Improved Process of Making Artificial Butter, of which the following is a specification:

My invention relates to the manufacture of butter for table use from oleine and margarine, as obtained from animal fats, fruits, and vegetable nuts, with lactic acid and loppered cream or milk.

To obtain the oleine and margarine from animal fats, I take any given quantity of animal fat, and cause the same to be cut or minced by any suitable machine for the purpose, after which I place the fat in a vessel, and subject it to a heat that will cause the whole mass to become fused. I then place the liquid fat in other vessels, and allow it to remain and cool until the degree of Fahrenheit is from 80° to 90°, and when in this state I place a portion in bags of cloth. These bags are then placed in a press and subjected to a high pressure, which causes the oleine and margarine to free itself from the stearine and fibrous tissue.

The above shall be known and designated as oleine and margarine No. 1.

The process above described will give the same results as described by Chevreaul in Brande's Work of Chemistry, page 482, and published in the year 1829.

To obtain the vegetable oleine and margarine, I use any one of the following articles of commerce, viz: oil peanut, oil sweet-almonds, and oil olives.

To produce the lactic acid, I take fourteen parts cane-sugar, sixty parts water, four parts caseine, and five parts chalk. This mixture is kept at a temperature of 80° to 95° Fahrenheit for eight or ten days, or until it becomes a crystalline paste of lactate lime. This is pressed in a cloth, dissolved in hot water, and filtered. This solution is then concentrated by evaporation. The acid is obtained from this lactate by treating it with the equivalent quantity of sulphuric acid and filtering from the insoluble gypsum. The solution of lactic acid I make as follows: one dram of lactic acid and sixteen ounces water. The solution of lactic acid assists digestion, it prevents the product from becoming deteriorated before use, and it assists also in giving the product a butyraceous consistency. By the use of lactic acid all putrefactive and catalytic action is arrested, which action would take place if such acid were not added, and by this means there is prepared an article which is fit for use at any time, and which will preserve its original state and flavor.

To obtain the loppered cream or milk, I take the cream as obtained from the surface of milk, or milk as obtained from the cow, and place it in open vessels, and allow it to remain until the putrefactive and catalytic action has taken place. When in this state it will be ready for use.

To obtain the margarine from the oleine and margarine No. 1, I take a given quantity of oleine and margarine designated as No. 1, and place it in a water-bath, and subject it to heat until the same assumes a semi-liquid state; then I place it in bags of cloth. These bags are then placed in a press and subjected to a high pressure, when the oleine will free itself from the margarine.

The above shall be known and designated as oleine No. 2.

I find that the composition of butter made from cows' milk, according to Robin, Verdeil, and described by Dalton in his work of Human Physiology, page 320, and published in the year 1867, is as follows: In one hundred parts—margarine, sixty-eight parts; oleine, thirty parts; butyrine, two parts; and it being a fact that butter made from cows' milk does not contain the same proportion of oleine and margarine in summer as in winter, it having a larger proportion of oleine in the winter, and having described the several articles that I use, and to enable others skilled in the art to make and use my discovery or invention, I will now give my improved process for making butter for winter and summer use.

To manufacture butter for table use in the winter by my improved process, I take and place in a suitable vessel nine parts of oleine No. 2, one part of fruit or nut oil, one part of solution lactic acid, one part of loppered cream or milk, as hereinbefore described. I then cause the same to be rapidly agitated with a revolving skeleton-beater until the whole assumes the consistence of butter made of cream taken from cows' milk, after which I add coloring matter, and then remove the mass upon a table or other suitable receptacle, and then work it until all the fluid portions are expressed. I then add salt to suit the taste, when it will be ready for use.

To manufacture the above for summer use, I take and place in a suitable vessel nine parts of oleine and margarine No. 1, one part of margarine as obtained from No. 1, one part of solution lactic acid, one part of loppered cream or milk, as hereinbefore described, and proceed as I do in making the same for winter use.

What I claim as my invention, and desire to secure by Letters Patent, is—

1. The process of making artificial butter by mixing together oleine and margarine from animal fats, and from fruit and vegetable nuts, and lactic acid, and loppered cream or milk, substantially as described.

2. The process of making artificial butter by mixing together oleine and margarine from animal fats, and lactic acid, and loppered cream or milk, substantially as described.

3. The process of preventing artificial butter from becoming deteriorated before use, and giving it a butyraceous consistence, by mixing with it lactic acid, substantially as described.

GARRET COSINE.

Witnesses:
JNO. R. LEFFERTS,
E. W. COSINE.